United States Patent [19]

Takamizawa et al.

[11] 4,320,172

[45] Mar. 16, 1982

[54] ORGANOPOLYSILOXANE RESIN COMPOSITIONS FOR RELEASE PAPERS

[75] Inventors: Minoru Takamizawa; Toshio Shinohara, both of Annaka; Yasushi Yamamoto, Takasaki; Tasuku Tanino; Kiyoyuki Takano, both of Tokushima; Fumiaki Mori, Annan, all of Japan

[73] Assignee: Shin-Etsu Chemical Co., Ltd., Tokyo, Japan

[21] Appl. No.: 165,148

[22] Filed: Jul. 1, 1980

[30] Foreign Application Priority Data

Jul. 9, 1979 [JP] Japan .................................. 54-86646
Jul. 13, 1979 [JP] Japan .................................. 54-89148

[51] Int. Cl.³ ...................... C08L 31/02; C08L 67/06; C08L 83/10
[52] U.S. Cl. .................................... 428/447; 428/452; 525/100; 525/101; 525/443; 525/446; 260/21
[58] Field of Search .............. 525/101, 443, 446, 479, 525/100; 260/21; 428/447

[56] References Cited

U.S. PATENT DOCUMENTS 3,644,566 2/1972 Kincheloe et al. ................. 525/101
3,714,287 1/1973 Campbell et al. ................... 525/101
4,024,100 5/1977 Kuhn et al. .......................... 525/443

FOREIGN PATENT DOCUMENTS 726694 3/1955 United Kingdom ................ 525/443

Primary Examiner—Wilbert J. Briggs, Sr.
Attorney, Agent, or Firm—Toren, McGeady & Stanger

[57] ABSTRACT

The invention provides a novel in-process release paper, i.e. a release paper used as a backing paper in the manufacturing of, e.g. a synthetic leather with a polyurethane resin. The releasing resin composition with which the release paper is coated is novel as comprising (a) a base resin selected from the group consisting of alkyd resins and acrylic resins modified with an organopolysiloxane, of which from 15 to 50% by moles of the organic groups directly bonded to the silicon atoms in a molecule are phenyl groups, having at least one hydroxy-substituted organic group directly bonded to the silicon atom in a molecule, (b) an alkanol-modified amino resin and (c) an acidic catalyst. The inventive in-process release paper is very superior to the conventional ones in the very much reduced peeling resistance, increased surface gloss and durability in repeated use.

5 Claims, No Drawings

ORGANOPOLYSILOXANE RESIN COMPOSITIONS FOR RELEASE PAPERS

BACKGROUND OF THE INVENTION

The present invention relates to a resin composition suitable for providing coating layers on release papers or, more particularly, to a resin composition suitable for providing coating layers on in-process release papers used in the manufacturing process of, for example, synthetic leathers from polyurethane resins, polyvinyl chloride resins, polyamide resins, poly(amino acid) resins and the like by the method of casting or similar processes. The inventive resin composition not only satisfies general requirements for the in-process releasing agents but also gives in-process release papers having excellent peelability at elevated temperatures and surface gloss.

Hitherto known resin compositions used to impart releasability or peelability to the surface of papers used in various manufacturing processes are classified to polypropylene-based ones, aminoalkyd resin-based ones and silicone resin-based ones as the typical classes in current use. These prior art resin compositions, however, have their own defective points or problems.

For example, release papers prepared with a polypropylene-based resin composition withstand repeated use with highly durable peelability but their performance is limited in use at a relatively high temperature. When used at an elevated temperature, the surface of the release paper is apt to be marred and no strong gloss can be imparted to the surface of the products such as synthetic leathers.

On the other hand, aminoalkyd resin-based compositions are superior in respect of the surface gloss of products but rather inferior in their peelability while silicone resin-based ones have excellent peelability but poor gloss so that they are not suitable for the manufacture of synthetic leathers of high surface gloss.

Thus, it has been an important problem in the technology of release papers to develop a novel resin composition suitable for the preparation of in-process release papers having good releasability or peelability and durability in high temperature use and capable of producing synthetic leathers and other products with high surface gloss.

SUMMARY OF THE INVENTION

The primary object of the present invention is therefore to provide a novel and improved in-process release paper having good releasability and durability even in use at an elevated temperature and capable of producing synthetic leathers and other products having high surface gloss.

Another object of the invention is to provide a novel and improved resin composition suitable for providing coating layers on in-process release papers having good releasability and durability even in use at an elevated temperature and capable of producing synthetic leathers and other products having high surface gloss.

The inventive resin composition for in-process release papers comprises (a) 100 parts by weight of a base resin selected from the group consisting of alkyd resins and acrylic resins modified with an organopolysiloxane, of which from 15 to 50% by moles of the organic groups directly bonded to the silicon atoms in a molecule are phenyl groups, having at least one hydroxy-substituted organic group directly bonded to the silicon atom in a molecule as represented by the general formula

$$HO-R^1(S)_aR^2-, \ldots \qquad (I)$$

in which $R^1$ and $R^2$ are each independently a divalent hydrocarbon group and $a$ is zero or 1, (b) from 15 to 150 parts by weight of an alkanol-modified amino resin, and (c) from 1 to 20 parts by weight of an acidic catalyst.

DETAILED DESCRIPTION OF THE PREFERRED EMBODIMENTS

The base resin as the component (a) in the inventive resin composition is an alkyd resin or an acrylic resin modified with an organopolysiloxane as specified above. The organopolysiloxane has from 15 to 50% by moles of phenyl groups based on the total number of the organic groups directly bonded to the silicon atoms in a molecule and also must have at least one hydroxy-substituted organic group represented by the above general formula (I) as directly bonded to one of the silicon atoms in a molecule.

The organic groups other than the phenyl groups and the above defined hydroxy-substituted organic group or groups are preferably alkyl groups such as methyl, ethyl, propyl, octyl and the like or those substituted alkyl groups obtained by replacing part or all of the hydrogen atoms in these alkyl groups with halogen atoms, e.g. chlorine, or cyano groups or other substituent groups.

The organopolysiloxane has preferably a linear molecular structure but organopolysiloxanes of branched molecular structure may also be used provided that the organopolysiloxane may have good miscibility with the alkyd resin or acrylic resin to be modified therewith so as that the resultant base resin has good properties suitable for the preparation of the inventive resin composition or release paper. A typical example of the molecular structure of the organopolysiloxane is expressed by the following structural formula

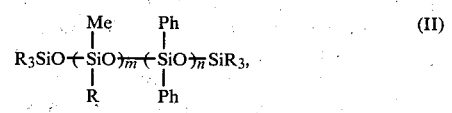

$$R_3SiO(\underset{\underset{R}{|}}{\overset{\overset{Me}{|}}{Si}}O)_{\overline{m}}(\underset{\underset{Ph}{|}}{\overset{\overset{Ph}{|}}{Si}}O)_{\overline{n}}SiR_3, \qquad (II)$$

in which Me is a methyl group, Ph is a phenyl group, m and n are each a positive integer with the proviso that m+n is in the range from 30 to 1000 or, preferably, from 50 to 200, and R is an organic group, at least one of the groups R being the hydroxy-substituted organic group represented by the general formula (I) above and the number of the phenyl groups being from 15 to 50% of the total number of the organic groups bonded directly to the silicon atoms in a molecule. The groups R other than the hydroxy-substituted organic group or groups are substituted or unsubstituted alkyl groups as mentioned above.

The reason for the limitation in the molar percentage of the phenyl groups in the organopolysiloxane is that satisfactory release papers are obtained only with the use of such an organopolysiloxane.

Several of the examples of the hydroxy-substituted organic group represented by the above given general formula (I), in which $R^1$ and $R^2$ are each independently a divalent hydrocarbon group and $a$ is zero or 1, are —CH$_2$CH$_2$—, —CH$_2$CH$_2$CH$_2$—, and —(CH$_2$)$_b$S(CH$_2$)$_c$—, in which b is 1 or 2 and c is 2 or 3.

In the next place, the method for the preparation of an alkyd resin or acrylic resin modified with the organopolysiloxane is described.

First, modification of an alkyd resin with the organopolysiloxane is carried out either (1) by the method in which the reaction between a polyvalent alcohol, a fatty acid and a polybasic acid as the ordinary procedure for the preparation of an alkyd resin is performed in the presence of the organopolysiloxane which serves as a part of the alcoholic reactant or (2) by the method in which an alkyd resin prepared in advance is brought into reaction with the organopolysiloxane.

The fatty acid component used in the above mentioned first method can be any one of conventionally used acids for the preparation of alkyd resins and exemplified by saturated fatty acids such as octoic acid, lauric acid, palmitic acid and the like, and unsaturated oils and unsaturated fatty acids such as coconut oil, coconut oil fatty acid, castor oil, castor oil fatty acid, soybean oil, soybean oil fatty acid and the like. From the standpoint of peelability and the performance of the coating films, the fatty acid component has preferably an oil length of 0 to 60 or, more preferably, from 20 to 40. The polybasic acid is exemplified by phthalic anhydride, isophthalic acid, adipic acid, maleic anhydride, fumaric acid, trimellitic anhydride and the like. In some cases, benzoic acid is used in combination with the above acids.

The polyvalent alcohol used in the first method is exemplified by glycols such as ethyleneglycol, diethyleneglycol, propyleneglycol, neopentylglycol and the like, glycerine, trimethylolpropane, trimethylolethane, pentaerithritol and the like.

The preparation of the organopolysiloxane-modified alkyd resin by the first method is carried out with a mixture of the above mentioned components of the alcohol, fatty acid and polybasic acid with the organopolysiloxane in predetermined amounts which is subjected to condensation reaction with heating according to a conventional procedure. Alternatively, the components of the fatty acid and the polybasic acid are first received with the organopolysiloxane and this reaction product is further admixed with the polyvalent alcohol and an additional amount of the polybasic acid to be subjected to the condensation reaction with heating.

The molar ratio of the reactants, i.e. the ratio of the polyvalent alcohol to the acid components, should be such that the OH/COOH equivalent ratio is in the range from 1.0 to 1.6 or, preferably, from 1.2 to 1.4. The organopolysiloxane is used in such an amount that it constitutes from 0.1 to 50% by weight or, preferably, from 1 to 40% by weight of the finally obtained organopolysiloxane-modified alkyd resin as solid. The reaction temperature of the above procedure is determined in accordance with the temperature for the conventional synthetic procedures of alkyd resins usually in the range from 180° to 230° C.

In the second method for the preparation of the organopolysiloxane-modified alkyd resin, i.e. the method of reacting the organopolysiloxane with an alkyd resin prepared in advance, the alkyd resin suitable for the purpose is desirably one prepared with an oil or fatty acid having an oil length of 0 to 60 or, preferably, 20-40, an acid value of 1-30 or, preferably, 5-25 and a hydroxyl value of 50-300 or, preferably, 100-300 such as coconut oil, coconut oil fatty acid, soybean oil, soybean oil fatty acid, castor oil, castor oil fatty acid, rice-bran oil fatty acid and the like.

The reaction of such an alkyd resin with the organopolysiloxane is carried out usually at a temperature of 60°-200° C. or, preferably, 100°-180° C. The proceeding of the condensation reaction can be followed by periodically checking the viscosity, acid value and hydroxyl value of the reaction mixture under reaction and the reaction is continued until these values reach desired levels.

The amount of the organopolysiloxane to be reacted with the alkyd resin in this second method is, similar to the first method, desirably in the range from 0.1 to 50% by weight or, preferably, from 1 to 40% by weight based on the finally obtained organopolysiloxane-modified alkyd resin as solid. It is optional to use a small amount of an amino resin or other suitable resin in combination with the alkyd resin.

In the next place, the method for the preparation of the organopolysiloxane-modified acrylic resin as the component (a) is described. This preparation is also conducted in two different ways either (1) by the method in which acrylic monomers such as $\alpha,\beta$-unsaturated carboxylic acids or esters thereof are polymerized just in the same manner as in the preparation of an ordinary acrylic resin but in the presence of the organopolysiloxane or (2) by the method in which the organopolysiloxane is reacted with an acrylic resin prepared in advance.

The above mentioned acrylic monomers, i.e. $\alpha,\beta$-unsaturated carboxylic acids and esters thereof, are exemplified by acrylic acid and esters thereof and methacrylic acid and esters thereof with alcohols such as methyl, ethyl, propyl, butyl, 2-ethylhexyl, stearyl, 2-hydroxyethyl, 3-hydroxypropyl and allyl alcohols. Certain unsaturated amide compounds such as acrylamide, methacrylamide, N-methylolacrylamide and N-methylolmethacrylamide are also used in combination with the unsaturated carboxylic acids or esters thereof.

It is of course optional that the above named acrylic monomers are copolymerized according to need with minor amounts of other ethylenically unsaturated monomers such as maleic acid, fumaric acid, itaconic acid, styrene, $\alpha$-methylstyrene, 2-ethylstyrene, glycidyl methacrylate, glycidyl acrylate, vinyl acetate, vinyl propionate and the like.

The polymerization of these monomers in the presence of the organopolysiloxane is performed in accordance with the general procedure for the preparation of ordinary acrylic resins. The temperature of polymerization is usually in the range from 30° to 150° C. or, preferably, from 100° to 150° C.

The amount of the organopolysiloxane to be used is desirably in an amount from 0.1 to 50% by weight or, preferably, from 1 to 40% by weight of the finally obtained organopolysiloxane-modified acrylic resin as solid.

The acrylic resin used in the second method for the preparation of the organopolysiloxane-modified acrylic resin, i.e. the method of reacting the organopolysiloxane with an acrylic resin prepared in advance, may be any one of conventionally known ones. The temperature of this reaction is in the range from 60° to 150° C. or, preferably, from 100° to 150° C. and the proceeding of the reaction can be monitored by periodically measuring the viscosity and hydroxyl value of the reaction mixture under reaction. The reaction is continued until these values have reached desired values.

The amount of the organopolysiloxane to be used in this second method is also desirably from 0.1 to 50% by weight or, preferably, from 1 to 40% by weight of the finally obtained organopolysiloxane-modified acrylic resin as solid. It is optional to use a small amount of an amino resin or other suitable resin in combination with the acrylic resin in this second method.

The alkanol-modified amino resin as the component (b) in the inventive resin composition can be any one of commercially available ones. Several examples of suitable types of the resin are methoxymethylol melamine resins, butoxymethylol melamine resins, butoxymethylolurea-melamine cocondensation resins, methoxymethylol benzoguanamine resins and the like.

Further, the acidic catalyst as the component (c) in the inventive resin composition may be any one of conventionally used curing catalysts for aminoalkyd resins and the like such as paratoluene sulfonic acid and hydrochloric acid.

The ratios of the amounts of the components (a), (b) and (c) in the inventive resin composition are important from the standpoint of obtaining objective resin compositions for in-process release papers having good heat resistance and releasability and capable of giving products with high surface gloss. The amounts of the components (b) and (c) are from 15 to 150 parts by weight and from 1 to 20 parts by weight per 100 parts by weight of the component (a). Any formulations outside these ranges cannot give satisfactory resin compositions or release papers with the above mentioned desirable properties. It is optional that the organopolysiloxane-modified alkyd and acrylic resins are used simultaneously in combination as the component (a) and it is also optional to formulate a minor amount of conventional alkyd resins, acrylic resins or silicone-modified alkyd resins with the organopolysiloxane-modified alkyd or acrylic resins according to the invention.

The inventive resin composition is used usually as diluted with an organic solvent for convenience in the coating step on to paper bases of the release paper. The organic solvent for this purpose is not particularly limited in so far as it has no reactivity with the components of the resin composition. Several examples of the suitable organic solvents are benzene, toluene, xylene, methyl alcohol, ethyl alcohol, isobutyl alcohol, n-butyl alcohol, methylethylketone, acetone, tetrahydrofuran and the like. It is of course optional to use a mixture of two kinds or more of these organic solvents. The concentration of the inventive resin composition in the solution should be naturally determined in consideration of the available techniques or machines for practicing the coating step with the solution and usually the solution contains from 10 to 60% by weight of the resin composition as solid.

The coating amount of the inventive release papers with the resin composition is in the range of 1 to 30 μm of the thickness of the coating layer as dried. The paper base of the release paper is desirably a clay-coated paper and the paper base coated with the resin composition is heated at 130° to 200° C. to cure the resin composition so that an in-process release paper with highly glossy surface and having excellent peelability is obtained.

The inventive in-process release paper prepared with the above described resin composition has higher surface gloss than conventional in-process release papers and is excellent in releasability and heat resistance. Further, manufacturing of synthetic leathers can be conducted at higher temperatures and within short time when the inventive in-process release paper is used largely contributing to the reduction of production costs. In addition, the coating films on the release paper formed with the inventive resin composition have good mechanical strengths and durable even in repeated use without decreasing of the releasability. Thus, the inventive in-process release paper is applicable not only to the manufacture of high surface gloss products but also for the manufacture of products with matted surfaces.

In the following, the preparation of the organopolysiloxane-modified alkyd and acrylic resins as the component (a) in the inventive resin composition as well as the release papers according to the invention are described in further detail by way of examples. In the following description, all parts by weight are given merely by parts.

Preparation 1. (Preparation of the Organopolysiloxane)

Into a flask were introduced 700 g of a starting diorganopolysiloxane with the main chains composed of 65% by moles of dimethylsiloxane units and 35% by moles of diphenylsiloxane units and terminated at both chain ends with dimethylvinylsiloxy groups and having a viscosity of 1900 centipoise at 25° C., 13.3 g of 2-mercaptoethyl alcohol, 2 g of benzophenone as a photoreaction accelerator and 700 g of toluene as a reaction medium and the reaction mixture thus formed was irradiated with a 100 watts high pressure mercury lamp put into the flask at the top thereof for 2 hours to effect the reaction.

After the end of the above reaction time, toluene was removed from the reaction mixture by distillation so that 705 g of a diorganopolysiloxane containing hydroxy-substituted organic groups expressed by the formula

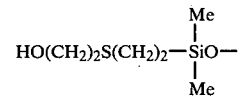

as bonded at the chain terminals of the polysiloxane were obtained where the structure of the main chain was unchanged by the reaction. This organopolysiloxane product had a viscosity of 2500 centipoise.

Preparation 2. (Preparation of the Organopolysiloxane)

Into a flask were introduced 1000 g of a starting diorganopolysiloxane with the main chains composed of 75% by moles of dimethylsiloxane units and 25% by moles of diphenylsiloxane units and terminated at both chain ends with dimethylvinylsiloxy groups and having a viscosity of 1000 centipoise at 25° C., 16 g of 2-mercaptoethyl alcohol, 4 g of benzophenone and 1000 g of toluene and the reaction mixture was irradiated with light in the same manner as in the preceding example to effect the reaction.

Removal of toluene from the reaction mixture gave 1005 g of a diorganopolysiloxane product having a viscosity of 2000 centipoise at 25° C. and terminated at both chain ends with the same hydroxy-substituted organic groups as in the preceding example.

Preparation 3. (Preparation of the Organopolysiloxane)

Into a flask were introduced 800 g of a starting diorganopolysiloxane with the main chains composed of 85% by moles of dimethylsiloxane units and 15% by moles of diphenylsiloxane units and terminated at both chain ends with dimethylvinylsiloxy groups and having a viscosity of 300 centipoise at 25° C., 40 g of 2-mercaptoethyl alcohol, 5 g of benzophenone and 800 g of toluene and the reaction mixture was irradiated with light in the same manner as in the preceding examples to effect the reaction.

Removal of toluene from the reaction mixture after completion of the reaction gave 830 g of a diorganopolysiloxane product having a viscosity of 800 centipoise at 25° C. and terminated at both chain ends with the same hydroxy-substituted organic groups as in the preceding examples.

Preparation 4. (Preparation of an Organopolysiloxane-Modified Alkyd Resin

Into a reaction vessel were introduced 109 parts of the diorganopolysiloxane terminated at both chain ends with the hydroxy-substituted organic groups obtained in Preparation 1 above, 172 parts of coconut oil fatty acid, 249 parts of phthalic anhydride and 169 parts of glycerine and the reaction mixture was heated under nitrogen atmosphere at 150° to 200° C. for about 8 hours to effect the condensation reaction. After completion of the reaction, the reaction mixture was diluted with toluene to a solid content of 60% by weight into 1080 parts of a toluene solution of the organopolysiloxane-modified alkyd resin. This resin solution had a viscosity of D as determined with a Gardner viscosimeter at 25° C., an acid value of 3.0 and a hydroxyl value of 65.

Preparation 5. (Preparation of an Organopolysiloxane-Modified Alkyd Resin)

Into a reaction vessel were introduced 57 parts of the diorganopolysiloxane terminated at both chain ends with the hydroxy-substituted organic groups obtained in Preparation 2 above, 180 parts of coconut oil fatty acid, 260 parts of phthalic anhydride and 177 parts of glycerine and the condensation reaction was carried out in the same manner as in preparation 4 followed by bilution of the reaction mixture with toluene to give 1040 parts of a solution of an organopolysiloxane-modified alkyd resin of 60% solid content. This resin solution had a Gardner viscosity of H, an acid value of 2.6 and a hydroxyl value of 73.

Preparation 6. (Preparation of an Organopolysiloxane-modified Alkyd Resin)

Into a reaction vessel were introduced 32 parts of the diorganopolysiloxane terminated at both chain ends with the hydroxy-substituted organic groups obtained in Preparation 3 above, 200 parts of coconut oil fatty acid, 290 parts of phthalic anhydride and 197 parts of glycerine and the condensation reaction was carried out in the same manner as in Preparation 4 followed by dilution of the reaction mixture with toluene to give 1100 parts of a solution of an organopolysiloxane-modified alkyd resin of 60% solid content. This resin solution had a Gardner viscosity of K, an acid value of 2.8 and a hydroxyl value of 76.

Preparation 7. (Preparation of an Organopolysiloxane-modified Alkyd Resin)

Into a reaction vessel were introduced 30 parts of the diorganopolysiloxane obtained in Preparation 1 above, 224 parts of soybean oil fatty acid, 249 parts of phthalic anhydride and 169 parts of glycerine and the condensation reaction was carried out in the same manner as in Preparation 4 followed by dilution of the reaction mixture with toluene to give 1040 parts of a solution of an organopolysiloxane-modified alkyd resin of 60% solid content. This resin solution had a Gardner viscosity of I-J, an acid value of 3.5 and a hydroxyl value of 70.

PreparatioN 8. (Preparation of an Organopolysiloxane-modified Alkyd Resin)

Into a reaction vessel were introduced 29 parts of the diorganopolysiloxane terminated at both chain ends with the hydroxy-substituted organic groups obtained in Preparation 1, 232 parts of castor oil, 215 parts of phthalic anhydride and 158 parts of trimethylolpropane and the condensation reaction was carried out in the same manner as in Preparation 4 above followed by dilution of the reaction mixture with toluene to give 1010 parts of a solution of an organopolysiloxane-modified alkyd resin of 60% solid content. This resin solution had a Gardner viscosity of $Z_3$, an acid value of 5.8 and a hydroxyl value of 71.

PreparatioN 9. (Preparation of an Organopolysiloxane-modified Alkyd Resin)

A mixture composed of 28 parts of the diorganopolysiloxane terminated at both chain ends with the hydroxy-substituted organic groups obtained in Preparation 1 and 172 parts of coconut oil fatty acid was heated under nitrogen atmosphere at 180° C. for 3 hours. The resultant reaction mixture had an acid value of 224.

Into the above reaction mixture were added 86 parts of ethyleneglycol, 94 parts of pentaerithritol and 249 parts of phthalic anhydride and the reaction was further continued for 8 hours at 150° to 200° C. followed by dilution of the reaction mixture with toluene to give 960 parts of a solution of an organopolysiloxane-modified alkyd resin of 60% solid content. This resin solution had a Gardner viscosity of M, an acid value of 4.0 and a hydroxyl value of 65.

Preparation 10 (Preparation of an Organopolysiloxane-modified Alkyd Resin)

Into a reaction vessel were introduced 35 parts of the diorganopolysiloxane terminated at both chain ends with the hydroxy-substituted organic groups obtained in Preparation 1 and 700 parts of a 50% xylene solution of a coconut oil-modified alkyd resin (Tokushinol 2420-50, a product by Tokushima Seiyu Co., Japan) having a Gardner viscosity of Z at 25° C., an oil length of 20, an acid value of 15 and a hydroxyl value of 95 and the reaction mixture was heated under nitrogen atmosphere for about 5 hours at 130° to 150° C. to effect the condensation reaction followed by dilution of the reaction mixture with toluene to give 760 parts of a solution of an organopolysiloxane-modified alkyd resin of 50% solid content. This resin solution had a Gardner viscosity of W, an acid value of 12.0 and a hydroxyl value of 82.

Preparation 11. (Preparation of an Organopolysiloxane-modified Acrylic Resin)

Into a mixture of 40 parts of the diorganopolysiloxane terimated at both chain ends with the hydroxy-substituted organic groups obtained in Preparation 1 and 304 parts of xylene heated at 125° to 130° C. under nitrogen atmosphere was added dropwise at a constant rate over a period of 3 hours a mixture composed of:
40 parts of methacrylic acid;

180 parts of methyl methacrylate;
80 parts of butyl methacrylate;
60 parts of styrene;
40 parts of 2-hydroxyethyl acrylate;
11 parts of α,α'-azobisisobutyronitrile; and
2 parts of di-tert-butyl peroxide.

After completion of the addition of the above mixture, the reaction mixture was heated for additional 5 hours at the same temperature to effect polymerization into 755 parts of a solution of an organopolysiloxane-modified acrylic resin of 60.5% solid content. This resin solution had a Gardner viscosity of T at 25° C. and a hydroxyl value of 25.

Preparation 12. (Preparation of an Organopolysiloxane-modified Acrylic Resin)

The procedure was just the same as in Preparation 11 above except that the diorganopolysiloxane obtained in Preparation 2 was used in place of the diorganopolysiloxane obtained in Preparation 1 to give 760 parts of a resin solution. The resultant resin solution containing 60.7% solid had a Gardner viscosity of S-T and a hydroxyl value of 25.

Preparation 13. (Preparation of an organopolysiloxane-modified Acrylic Resin)

The procedure was just the same as in Preparation 11 above except that the diorganopolysiloxane obtained in Preparation 3 was used in place of the diorganopolysiloxane obtained in Preparation 1 to give 760 parts of a solution of an organopolysiloxane-modified acrylic resin. The resultant resin solution containing 60.5% of solid had a Gardner viscosity of S and a hydroxyl value of 25.

Preparation 14. (Preparation of an Organopolysiloxane-modified Acrylic Resin)

Into a mixture composed of 80 parts of the diorganopolysiloxane terminated at both chain ends with the hydroxy-substituted organic groups obtained in Preparation 1 above and 331 parts of xylene heated at 125° to 130° C. was added dropwise over a period of 3 hours a mixture composed of:
40 parts of acrylic acid;
120 parts of methyl methacrylate;
200 parts of butyl acrylate;
40 parts of 2-hydroxyethyl acrylate;
11 parts of α,α'-azobisisobutyronitrile; and
2 parts of di-tert-butyl peroxide.

After completion of the addition of the above monomer mixture, the reaction mixture was further heated for 5 hours at the same temperature to effect polymerization into 820 parts of a solution of an organopolysiloxane-modified acrylic resin. This resin solution containing 59.8% of solid had a Gardner viscosity of K and a hydroxyl value of 23.

Preparation 15. (Preparation of an Organopolysiloxane-modified Acrylic Resin)

A mixture composed of 42 parts of the diorganopolysiloxane terminated at both chain ends with the hydroxy-substituted organic groups obtained in Preparation 1 and 700 parts of a 60% xylene solution of an acrylic resin having a Gardner viscosity of R, an acid value of 7.0 and a hydroxyl value of 72 (Tesloid 795, a product by Tokushima Seiyu Co., Japan) was heated at 130° to 180° C. for about 5 hours to effect the reaction between the components into 742 parts of a solution of an organopolysiloxane-modified acrylic resin.

After dilution with xylene to a solid content of 60%, the resin solution had a Gardner viscosity of 0, an acid value of 6.3 and a hydroxyl value of 66.

Preparation 16. (Preparation of an Organopolysiloxane-modified Acrylic Resin)

The procedure was about the same as in Preparation 11 except that the monomer mixture added to the mixture of the diorganopolysiloxane and xylene was composed of:
40 parts of methacrylic acid;
80 parts of methyl methacrylate;
200 parts of butyl methacrylate;
40 parts of styrene;
40 parts of 2-hydroxyethyl acrylate;
11 parts of α,α'-azobisisobutyronitrile; and
2 parts of di-tert-butyl peroxide.

About 5 hours of heating of the reaction mixture gave 755 parts of a solution of an organopolysiloxane-modified acrylic resin. The resin solution containing 60.5% of solid had a Gardner viscosity of N and a hydroxyl value of 25.

Preparation 17. (Preparation of an Organopolysiloxane-modified Acrylic Resin)

The procedure was the same as in the preceding Preparation except that the diorganopolysiloxane obtained in Preparation 3 was used in place of the diorganopolysiloxane obtained in Preparation 1 and the monomer mixture added to the mixture of the diorganopolysiloxane and xylene was composed of:
40 parts of acrylic acid;
120 parts of methyl methacrylate;
200 parts of butyl acrylate;
40 parts of 2-hydroxyethyl acrylate;
11 parts of α,α'-azobisisobutyronitrile; and
2 parts of di-tert-butyl peroxide.

Heating of the reaction mixture for 5 hours gave 755 parts of a 60% solid resin solution having a Gardner viscosity of L and a hydroxyl value of 25.

EXAMPLE 1

A coating solution was prepared by admixing 60 parts of the modified alkyd resin solution obtained in Preparation 4, 40 parts of a 60% isobutyl alcohol solution of a butylated urea-melamine cocondensation resin(Tesmine 350-60, a product by Tokushima Seiyu Co., Japan) and 5 parts of a 50% methyl alcohol solution of a p-toluene sulfonic acid-containing acidic catalyst (Drier 50, a product by the same company) as diluted to a solid content of 40% with toluene.

A clay-coated paper having a basis weight of 130 g/m$^2$ (Mirror-Coat, a product by Kanzaki Seishi Co., Japan) was coated with this coating solution to give a 10 μm thick coating layer as dried followed by heating at 150° C. for 1 minute in an air oven to cure the resin. The thus obtained release paper had a surface gloss of 99% as measured with a gloss meter at an angle of 75°.

Further, the above prepared release paper was overcoated with a one-package type polyurethane solution (Crysbon 5516S, a product by Dai-Nippon Ink Kagaku Kogyo Co., Japan) in a coating amount of 20 μm film thickness as dried followed by heating at 130° C. for 2 minutes in an air oven and subjected to the test of peelability.

The initial value of the peeling resistance was 6 g/3 cm and increased to 10 g/3 cm in the third test after repeated use.

EXAMPLE 2

A coating solution was prepared with 60 parts of the modified alkyd resin solution obtained in Preparation 5, 40 parts of Tesmine 350-60 (see Example 1) and 5 parts of Drier 50 (see Example 1) and release papers were prepared in the same manner as in Example 1. The surface gloss of the release paper was 100%.

The peeling test undertaken in the same manner as in Example 1 gave an initial value of the peeling resistance of 6 g/3 cm which increased to 15 g/3 cm in the third test after repeated use.

EXAMPLE 3

The procedure for the preparation of release paper was the same as in Example 1 except that the modified alkyd resin solution obtained in Preparation 6 was used in place of the resin solution obtained in Preparation 4. The release paper had a surface gloss of 100% and the peeling test gave an initial value of the peeling resistance of 7 g/3 cm which increased to 15 g/3 cm in the third test after repeated use.

EXAMPLE 4

The procedure for the preparation of release paper was the same as in Example 1 except that the modified alkyd resin solution obtained in Preparation 7 was used in place of the resin solution obtained in Preparation 4. The release paper had a surface gloss of 100% and the peeling test gave an initial value of the peeling resistance of 27 g/3 cm which increased to 40 g/3 cm in the third test after repeated use.

EXAMPLE 5

The procedure for the preparation of release paper was the same as in Example 1 except that the modified alkyd resin solution obtained in Preparation 8 was used in place of the resin solution obtained in Preparation 4. The release paper had a surface gloss of 100% and the peeling test gave an initial value of the peeling resistance of 25 g/3 cm which increased to 40 g/3 cm in the third test after repeated use.

EXAMPLE 6

The procedure for the preparation of release paper was the same as in Example 1 except that the modified alkyd resin solution obtained in Preparation 9 was used in place of the resin solution obtained in Preparation 4. The release paper had a surface gloss of 100% and the peeling test gave an initial value of the peeling resistance of 32 g/3 cm which increased to 50 g/3 cm in the third test after repeated use.

EXAMPLE 7

The procedure for the preparation of release paper was the same as in Example 1 except that the modified alkyd resin solution obtained in Preparation 10 was used in place of the resin solution obtained in Preparation 4 and the amount of the resin solution was increased to 72 parts instead of 60 parts. The release paper had a surface gloss of 100% and the peeling test gave an initial value of the peeling resistance of 9 g/3 cm which increased to 15 g/3 cm in the third test after repeated use.

EXAMPLE 8

A coating solution was prepared with 60 parts of the modified alkyd resin solution obtained in Preparation 7, 48 parts of a 50% n-butyl alcohol solution of a butylated melamine resin (Tesmine ME50L, a product by Tokushima Seiyu Co., Japan) and 10 parts of Drier 50 (see Example 1) and release paper was prepared in the same manner as in Example 1. The release paper had a surface gloss of 100% and the peeling test gave an initial value of the peeling resistance of 20 g/3 cm which increased to 35 g/3 cm in the third test after repeated use.

EXAMPLE 9

Release paper was prepared with a coating solution obtained by blending 30 parts of the modified alkyd resin solution obtained in Preparation 4, 30 parts of a 60% xylene solution of a coconut oil-modified alkyd resin (Tokushinol 2411-60, a product by Tokushima Seiyu Co., Japan) having an oil length of 33, 48 parts of Tesmine ME50L (see Example 8) and 10 parts of Drier 50 (see Example 1) in the same manner as in Example 1. The release paper had a surface gloss of 101% and the peeling test gave an initial value of the peeling resistance of 8 g/3 cm which increased to 15 g/3 cm in the third test after repeated use.

EXAMPLE 10

Release paper was prepared with a coating solution obtained by blending 96 parts of the modified alkyd resin solution obtained in Preparation 10, 15 parts of a 80% n-butyl alcohol solution of a methylated melamine resin (Tesmine 201-80, a product by Tokushima Seiyu Co., Japan) and 10 parts of Drier 50 (see Example 1) in the same manner as in Example 1. The release paper had a surface gloss of 102% and the peeling test gave an initial value of the peeling resistance of 6 g/3 cm which increased to 8 g/3 cm in the third test after repeated use.

EXAMPLE 11

Release paper was prepared with a coating solution obtained by blending 10 parts of the modified alkyd resin solution obtained in Preparation 4, 20 parts of Tokushinol 2411-60 (see Example 9), 30 parts of a 60% xylene solution of an acrylic resin having a Gardner viscosity of R, acid value of 7.0 and hydroxyl value of 72 (Tesloid 795, a product by Tokushima Seiyu Co., Japan), 48 parts of Tesmine ME50L (see Example 8) and 10 parts of Drier 50 (see Example 1) in the same manner as in Example 1. The release paper had a surface gloss of 100% and the peeling test gave an initial value of the peeling resistance of 20 g/3 cm which increased to 40 g/3 cm in the third test after repeated use.

EXAMPLE 12

Release paper was prepared with a coating solution obtained by blending 24 parts of the modified alkyd resin solution obtained in Preparation 10, 20 parts of Tokushinol 2411-60 (see Example 9), 20 parts of Tesloid 795 (see Example 11), 48 parts of Tesmine ME50L (see Example 8) and 10 parts of Drier 50 (see Example 1) in the same manner as in Example 1. The release paper had a surface gloss of 100% and the peeling test gave an initial value of the peeling resistance of 18 g/3 cm in the third test after repeated use.

EXAMPLE 13

Release paper was prepared with a coating solution obtained by blending 40 parts of the modified alkyd resin solution obtained in Preparation 5, 15 parts of Tesloid 795 (see Example 11) and 10 parts of Drier 50 (see Example 1) in the same manner as in Example 1. The release paper had a surface gloss of 101% and the peeling test gave an initial value of the peeling resistance of 7 g/3 cm which increased to 10 g/3 cm in the third test after repeated use.

EXAMPLE 14

Release paper was prepared with a coating solution obtained by blending 60 parts of the modified acrylic resin solution obtained in Preparation 11, 40 parts of Tesmine 350-60 (see Example 1) and 5 parts of Drier 50 (see Example 1) in the same manner as in Example 1. The release paper had a surface gloss of 99% and the peeling test gave an initial value of the peeling resistance of 15 g/3 cm which increased to 23 g/3 cm in the third test after repeated use.

EXAMPLE 15

Release paper was prepared with a coating solution obtained by blending 60 parts of the modified acrylic resin solution obtained in Preparation 12, 40 parts of Tesmine 350-60 (see Example 1) and 5 parts of Drier 50 (see Example 1) in the same manner as in Example 1. The release paper had a surface gloss of 99% and the peeling test gave an initial value of the peeling resistance of 12 g/3 cm which increased to 20 g/3 cm in the third test after repeated use.

EXAMPLE 16

Release paper was prepared with a coating solution obtained by blending 60 parts of the modified acrylic resin solution obtained in Preparation 13, 40 parts of Tesmine 350-60 (see Example 1) and 5 parts of Drier 50 (see Example 1) in the same manner as in Example 1. The release paper had a surface gloss of 98% and the peeling test gave an initial value of the peeling resistance of 10 g/3 cm which increased to 15 g/3 cm in the third test after repeated use.

EXAMPLE 17

Release paper was prepared with a coating solution obtained by blending 60 parts of the modified acrylic resin solution obtained in Preparation 14, 40 parts of Tesmine 350-60 (see Example 1) and 5 parts of Drier 50 (see Example 1) in the same manner as in Example 1. The release paper had a surface gloss of 99% and the peeling test gave an initial value of the peeling resistance of 8 g/3 cm which increased to 10 g/3 cm in the third test after repeated use.

EXAMPLE 18

Release paper was prepared with a coating solution obtained by blending 60 parts of the modified acrylic resin solution obtained in Preparation 11, 48 parts of Tesmine ME50L (see Example 8) and 10 parts of Drier 50 (see Example 1) in the same manner as in Example 1. The release paper had a surface gloss of 101% and the peeling test gave an initial value of the peeling resistance of 12 g/3 cm which increased to 17 g/3 cm in the third test after repeated use.

EXAMPLE 19

Release paper was prepared with a coating solution obtained by blending 60 parts of the modified acrylic resin solution obtained in Preparation 15, 48 parts of Tesmine ME50L (see Example 8) and 10 parts of Drier 50 (see Example 1) in the same manner as in Example 1. The release paper had a surface gloss of 101% and the peeling test gave an initial value of the peeling resistance of 10 g/3 cm which increased to 15 g/3 cm in the third test after repeated use.

EXAMPLE 20

Release paper was prepared with a coating solution obtained by blending 60 parts of the modified acrylic resin solution obtained in Preparation 14, 48 parts of Tesmine ME50L (see Example 8) and 5 parts of Drier 50 (see Example 1) in the same manner as in Example 1. The release paper had a surface gloss of 101% and the peeling test gave an initial value of the peeling resistance of 14 g/3 cm which increased to 23 g/3 cm in the third test after repeated use.

EXAMPLE 21

Release paper was prepared with a coating solution obtained by blending 80 parts of the modified acrylic resin solution obtained in Preparation 12, 15 parts of a 80% n-butyl alcohol solution of a methylated melamine resin (Tesmine 201-80, a product by Tokushima Seiyu Co., Japan) and 10 parts of Drier 50 (see Example 1) in the same manner as in Example 1. The release paper had a surface gloss of 102% and the peeling test gave an initial value of the peeling resistance of 6 g/3 cm which increased to 10 g/3 cm in the third test after repeated use.

EXAMPLE 22

Release paper was prepared with a coating solution obtained by blending 30 parts of the modified alkyd resin solution obtained in Preparation 4, 30 parts of the modified acrylic resin solution obtained in Preparation 16, 40 parts of Tesmine 350-60 (see Example 1) and 5 parts of Drier 50 (see Example 1) in the same manner as in Example 1. The release paper had a surface gloss of 97% and the peeling test gave an initial value of the peeling resistance of 6 g/3 cm which increased to 10 g/3 cm in the third test after repeated use.

EXAMPLE 23

Release paper was prepared with a coating solution obtained by blending 30 parts of the modified alkyd resin solution obtained in Preparation 7, 30 parts of the modified acrylic resin solution obtained in Preparation 17, 40 parts of Tesmine 350-60 (see Example 1) and 5 parts of Drier 50 (see Example 1) in the same manner as in Example 1. The release paper had a surface gloss of 98% and the peeling test gave an initial value of the peeling resistance of 7 g/3 cm which increased to 10 g/3 cm in the third test after repeated use.

EXAMPLE 24

Release paper was prepared with a coating solution obtained by blending 30 parts of the modified alkyd resin solution obtained in Preparation 8, 30 parts of the modified acrylic resin solution obtained in Preparation 15, 40 parts of Tesmine 350-60 (see Example 1) and 5 parts of Drier 50 (see Example 1) in the same manner as in Example 1. The release paper had a surface gloss of 97% and the peeling test gave an initial value of the peeling resistance of 6 g/3 cm which increased to 10 g/3 cm in the third test after repeated use.

EXAMPLE 25

Release paper was prepared with a coating solution obtained by blending 36 parts of the modified alkyd resin solution obtained in Preparation 10, 30 parts of the modified acrylic resin solution obtained in Preparation 15, 48 parts of Tesmine ME50L (see Example 8) and 10 parts of Drier 50 (see Example 1) in the same manner as in Example 1. The release paper had a surface gloss of 100% and the peeling test gave an initial value of the peeling resistance of 6 g/3 cm which increased to 10 g/3 cm in the third test after repeated use.

EXAMPLE 26

Release paper was prepared with a coating solution obtained by blending 30 parts of the modified acrylic resin solution obtained in Preparation 16, 15 parts of the modified alkyd resin solution obtained in Preparation 4, 15 parts of Tokushinol 2411-60 (see Example 9), 48 parts of Tesmine ME50L (see Example 8) and 10 parts of Drier 50 (see Example 1) in the same manner as in Example 1. The release paper had a surface gloss of 100% and the peeling test gave an initial value of the peeling resistance of 9 g/3 cm which increased to 15 g/3 cm in the third test after repeated use.

COMPARATIVE EXAMPLE 1

Release paper was prepared with a coating solution obtained by blending 100 parts of a glossy type aminoalkyd resin for in-process release paper (Tespeel SP2400G, a product by Tokushima Seiyu Co., Japan) and 5 parts of Drier 50 (see Example 1) in the same manner as in Example 1. The release paper had a surface gloss of 98% and the peeling test gave an initial value of the peeling resistance of 220 g/3 cm which exceeded 300 g/3 cm in the third test after repeated use.

COMPARATIVE EXAMPLE 2

Release paper was prepared with a coating solution obtained by blending 100 parts of a 60% toluene solution of a coconut oil-modified alkyd resin having an oil length of 40% (Tokushinol 2400Y, a product by Tokushima Seiyu Co., Japan) and 55 parts of a partial hydrolysis product of mixed diisocyanates (Desmodur L, a product by Tokushima Seiyu Co., Japan) in the same manner as in Example 1. The release paper had a surface gloss of 103% and the peeling test gave an initial value of the peeling resistance of more than 300 g/3 cm, which value was also more than 300 g/3 cm in the third test after repeated use.

COMPARATIVE EXAMPLE 3

Release paper was prepared with a coating solution obtained by blending 100 parts of a glossy type aminoacrylic resin for in-process release paper (Tespeel SP94P, a product by Tokushima Seiyu Co., Japan) and 5 parts of Drier 50 (see Example 1) in the same manner as in Example 1. The release paper had a surface gloss of 99% and the peeling test gave an initial value of the peeling resistance of more than 300 g/3 cm while the overcoating polyurethane layer and the release paper could not be peeled off in the third test after repeated use.

COMPARATIVE EXAMPLE 4

Release paper was prepared with a coating solution obtained by blending 100 parts of Tesloid 795 (see Example 11) and 55 parts of Desmodur L (see Comparative Example 2) in the same manner as in Example 1. The release paper had a surface gloss of 103% and the peeling test gave an initial value of the peeling resistance of more than 300 g/3 cm, which value was also more than 300 g/3 cm in the third test after repeated use.

What is claimed is:

1. A resin composition which comprises
   (a) 100 parts by weight of a base resin selected from the group consisting of alkyd resins and acrylic resins modified with an organopolysiloxane, of which from 15 to 50% by moles of the organic groups directly bonded to the silicon atoms in a molecule are phenyl groups, having at least one hydroxy-substituted organic group directly bonded to the silicon atom in a molecule as represented by the general formula

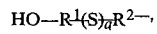
   $$HO-R^1(S)_aR^2-,$$

in which $R^1$ and $R^2$ are each independently a divalent hydrocarbon group and a is zero or 1,
   (b) from 15 to 150 parts by weight of an alkanol-modified amino resin, and
   (c) from 1 to 20 parts by weight of an acidic catalyst.

2. An in-process release paper which comprises
   (A) a paper base, and
   (B) a coating layer formed on the surface of the said paper base of a cured resin composition comprising
   (a) 100 parts by weight of a base resin selected from the group consisting of alkyd resins and acrylic resins modified with an organopolysiloxane, of which from 15 to 50% by moles of the organic groups directly bonded to the silicon atoms in a molecule are phenyl groups, having at least one hydroxy-substituted organic group directly bonded to the silicon atom in a molecule as represented by the general formula

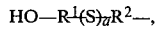
   $$HO-R^1(S)_aR^2-,$$

in which $R^1$ and $R^2$ are each independently a divalent hydrocarbon group and a is zero or 1,
   (b) from 15 to 150 parts by weight of an alkanol-modified amino resin, and
   (c) from 1 to 20 parts by weight of an acidic catalyst.

3. The resin composition as claimed in claim 1 wherein the organopolysiloxane is expressed by the structural formula

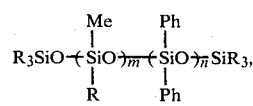
$$R_3SiO-(\underset{R}{\underset{|}{\overset{Me}{\overset{|}{Si}}}}O)_m-(\underset{Ph}{\underset{|}{\overset{Ph}{\overset{|}{Si}}}}O)_n-SiR_3,$$

in which Me is a methyl group, Ph is a phenyl group, m and n are each a positive integer with the proviso that m+n is in the range from 30 to 1000 and R is an organic group, at least one of the groups represented by R being the hydroxy-substituted organic group and the groups represented by R other than the hydroxy-substituted organic group being a monovalent hydrocarbon group.

4. The resin composition as claimed in claim 1 wherein the base resin as the component (a) contains from 0.1 to 50% by weight of the organopolysiloxane.

5. The resin composition as claimed in claim 1 wherein the alkanol-modified amino resin is selected from the group consisting of methoxymethylol melamine resins, butoxymethylol melamine resins, butoxymethylolurea-melamine cocondensation resins and methoxymethylol bonzoguanamine resins.

* * * * *